US010619461B2

(12) United States Patent
Kuhn

(10) Patent No.: US 10,619,461 B2
(45) Date of Patent: *Apr. 14, 2020

(54) METHOD AND APPARATUS FOR SEPARATING AND MEASURING MULTIPHASE IMMISCIBLE FLUID MIXTURES

(71) Applicant: Leroy Thomas Kuhn, Katy, TX (US)

(72) Inventor: Leroy Thomas Kuhn, Katy, TX (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/835,866

(22) Filed: Dec. 8, 2017

(65) Prior Publication Data
US 2018/0128087 A1    May 10, 2018

Related U.S. Application Data

(63) Continuation of application No. 15/606,307, filed on May 26, 2017, now Pat. No. 9,840,895.
(Continued)

(51) Int. Cl.
*E21B 43/12* (2006.01)
*G01F 15/08* (2006.01)
(Continued)

(52) U.S. Cl.
CPC .......... *E21B 43/12* (2013.01); *B01D 17/042* (2013.01); *B01D 17/044* (2013.01);
(Continued)

(58) Field of Classification Search
CPC .......... E21B 43/12; E21B 43/38; E21B 43/16; E21B 43/0122; E21B 21/06; E21B 21/063; E21B 21/08; E21B 43/34; E21B 49/00; E21B 49/08; E21B 49/087; E21B 2049/085; E21B 47/04; C02F 1/40; C02F 1/008; C02F 2209/42; B01D 17/044; B01D 17/042; B01D 17/02; B01D 17/0208; B01D 17/0214; B01D 17/12; B01D 21/10; B01D 21/24; B01D 21/2444; B01D 21/30;
(Continued)

(56) References Cited

U.S. PATENT DOCUMENTS 2,882,995 A * 4/1959 Smith ..................... G05D 9/04
73/200
3,488,996 A * 1/1970 Pfrehm ................... G01F 1/74
73/61.43
(Continued)

FOREIGN PATENT DOCUMENTS

EP        0134286 A2    3/1985

OTHER PUBLICATIONS

PTC International Preliminary Report on Patentability dated Nov. 27, 2018.

*Primary Examiner* — Joseph W Drodge
(74) *Attorney, Agent, or Firm* — Ted M. Anthony

(57) ABSTRACT

An automated process and accompanying apparatus simultaneously separates and measures the flow rate of any multiphase mixture of immiscible fluids. Such separation and measurement can occur in a single vessel, or multiple vessels. Liquid levels, together with a material balance analysis, are utilized to determine constituent liquid flow rates. The vessel(s) can be remotely operated and monitored in real time, while also allowing for automated or manual calibration.

20 Claims, 5 Drawing Sheets

Related U.S. Application Data

(60) Provisional application No. 62/447,990, filed on Jan. 19, 2017, provisional application No. 62/341,707, filed on May 26, 2016.

(51) Int. Cl.

| | | |
|---|---|---|
| *G01F 1/74* | (2006.01) | |
| *E21B 43/34* | (2006.01) | |
| *B01D 17/04* | (2006.01) | |
| *B01D 21/30* | (2006.01) | |
| *B01D 21/34* | (2006.01) | |
| *C02F 1/40* | (2006.01) | |
| *E21B 43/16* | (2006.01) | |
| *E21B 43/38* | (2006.01) | |
| *E21B 47/04* | (2012.01) | |
| *B01D 21/24* | (2006.01) | |
| *E21B 43/01* | (2006.01) | |
| *G01F 1/00* | (2006.01) | |

(52) U.S. Cl.
CPC ......... *B01D 21/2444* (2013.01); *B01D 21/30* (2013.01); *B01D 21/34* (2013.01); *C02F 1/40* (2013.01); *E21B 43/0122* (2013.01); *E21B 43/16* (2013.01); *E21B 43/34* (2013.01); *E21B 43/38* (2013.01); *E21B 47/04* (2013.01); *G01F 1/007* (2013.01); *G01F 1/74* (2013.01); *G01F 15/08* (2013.01); *C02F 2209/42* (2013.01)

(58) Field of Classification Search
CPC .... B01D 21/302; B01D 21/307; B01D 21/34; B01D 19/00; B01D 19/063; B01D 21/2494; G01F 1/007; G01F 11/28; G01F 15/00; G01F 15/005; G01F 15/06; G01F 25/0061; G01F 23/00; G01F 23/18; G01F 23/185; G01F 23/30; G01F 23/64; G01F 23/70; G01F 23/76; G01F 22/00; G01N 1/10; G01N 1/18; G01N 1/34; G01N 1/40; G01N 33/18; G01N 33/1833; G01N 33/28; G01N 33/2823; G01N 33/2847
USPC .... 210/739, 743, 744, 800, 85, 86, 96.1, 94, 210/95, 103, 104, 114, 115, 121, 123, 210/128, 188, 513, 521, 522; 73/152.01, 73/152.18, 152.23, 290, 305–309, 323; 175/40, 66, 206, 207; 166/250.01, 166/250.03, 264–267, 75.11, 75.12; 137/2, 15.18, 552, 558, 571, 574, 575; 702/6, 9, 11, 12, 50, 55; 95/253; 96/157, 182, 220
See application file for complete search history.

(56) References Cited

U.S. PATENT DOCUMENTS

| | | | |
|---|---|---|---|
| 4,474,049 A | 10/1984 | Hansen et al. | |
| 4,600,844 A | 7/1986 | Atkins | |
| 4,951,700 A * | 8/1990 | Kalman | G01F 1/74 137/174 |
| 5,394,339 A * | 2/1995 | Jones | E21B 49/08 137/601.05 |
| 6,537,458 B1 | 3/2003 | Polderman | |
| 6,736,964 B1 * | 5/2004 | Caldwell | B01D 17/0208 210/87 |
| 7,311,001 B2 * | 12/2007 | Liu | B01D 17/0211 73/215 |
| 7,531,099 B1 | 5/2009 | Rhodes | |
| 7,565,243 B2 * | 7/2009 | Kim | G01V 1/302 702/2 |
| 8,881,810 B2 * | 11/2014 | Irani | E21B 49/08 166/105.5 |
| 9,114,332 B1 * | 8/2015 | Liu | B01D 19/0063 |
| 9,840,895 B1 * | 12/2017 | Kuhn | B01D 17/042 |
| 2006/0036418 A1 * | 2/2006 | Pita | E21B 49/00 703/10 |
| 2007/0089609 A1 * | 4/2007 | Dou | G01F 1/74 96/208 |
| 2008/0116072 A1 | 5/2008 | Liverud et al. | |
| 2009/0282985 A1 | 11/2009 | Whiteley | |
| 2010/0300682 A1 * | 12/2010 | Thakur | E21B 43/00 166/250.01 |
| 2011/0023595 A1 * | 2/2011 | Allouche | G01F 1/74 73/152.29 |
| 2011/0090088 A1 | 4/2011 | Kenney et al. | |
| 2011/0257788 A1 * | 10/2011 | Wiemers | B01D 61/022 700/267 |
| 2012/0253705 A1 * | 10/2012 | Chen | B01D 17/0214 702/47 |
| 2012/0285896 A1 * | 11/2012 | Black | B01D 17/0214 210/741 |
| 2012/0325751 A1 * | 12/2012 | Renick | E21B 43/26 210/739 |
| 2013/0312614 A1 | 11/2013 | Zainal Abidin et al. | |
| 2014/0090451 A1 | 4/2014 | Surman et al. | |
| 2016/0178499 A1 * | 6/2016 | McCrickard | B01D 17/0208 73/32 R |
| 2017/0174530 A1 * | 6/2017 | Yin | B01D 17/0214 |
| 2017/0232365 A1 * | 8/2017 | Phillips | E21B 21/062 210/767 |

* cited by examiner

METHOD AND APPARATUS FOR SEPARATING AND MEASURING MULTIPHASE IMMISCIBLE FLUID MIXTURES

CROSS REFERENCES TO RELATED APPLICATION

THIS APPLICATION IS A CONTINUATION OF U.S. NON-PROVISIONAL patent application Ser. No. 15/606,307, FILED May 26, 2017, CURRENTLY PENDING, WHICH CLAIMS PRIORITY OF U.S. PROVISIONAL PATENT APPLICATION Ser. No. 62/341,707, FILED May 26, 2016, AND U.S. PROVISIONAL PATENT APPLICATION Ser. No. 62/447,990, FILED Jan. 19, 2017, ALL INCORPORATED HEREIN BY REFERENCE.

STATEMENTS AS TO THE RIGHTS TO THE INVENTION MADE UNDER FEDERALLY SPONSORED RESEARCH AND DEVELOPMENT

NONE

BACKGROUND OF THE INVENTION

1. Field of the Invention

The present invention pertains to an apparatus and associated method for separating multiphase fluid mixtures into separate phases (gas and liquid), while measuring certain constituent components of said fluid mixtures. More particularly, the present invention pertains to an apparatus and method for separating a bulk production stream from a hydrocarbon producing well into separate phases (gas and liquid), separating liquid hydrocarbons from water, and independently measuring produced volumes of said liquid hydrocarbons, gas and/or water. More particularly still, the present invention pertains to an apparatus and method for meterless measurement of a bulk production stream from a hydrocarbon producing well, with continuous calibration of such measurement and no interruption of operations for such calibration.

2. Brief Description of the Prior Art

Accurate measurement of multiphase immiscible fluid mixtures is required in many different applications and settings. One such common application is the measurement of fluids produced from subterranean wells, such as oil and/or gas production wells. In many cases, bulk production from such wells comprises a multiphase stream of immiscible fluids comprising a mixture of liquid hydrocarbons (such as crude oil or condensate), formation water and natural gas. Often, such natural gas can be "free" gas, while in other cases such gas can be released from solution when liquid hydrocarbons are produced from a subterranean formation to the earth's surface.

Typically, such produced fluids must first be separated into different phases (i.e., gas and liquids) prior to disposition of such gas. Such gas should typically have very little, if any, liquid components prior to flaring or venting of the gas into the surrounding atmosphere, or delivery of the gas to a transportation pipeline. Many gas transportation pipelines limit the volume of liquids that can be delivered into said pipelines with such gas, while gas flaring and venting operations can be can negatively impacted by the presence of excess liquids in a gas stream.

Similarly, produced liquids—which frequently comprise an immiscible mixture of liquid hydrocarbons and formation water—typically must also be separated prior to disposition. Liquid hydrocarbons generally must be separated from formation water before such liquid hydrocarbons can be transported from a well site for ultimate use or sale. Many crude oil purchasers and/or transporters will not accept significant volumes of formation water with such oil. Similarly, separated formation water, which is typically re-injected into a disposal well or trucked to another location for disposal, should include little or no residual liquid hydrocarbons; such liquid hydrocarbons typically have value that can be realized, and their presence with produced water can frequently negatively impact water disposal operations.

Conventional methods of separating produced fluids from oil and/or gas wells typically involve separation of multi-phase fluids into gas, liquid hydrocarbons and/or formation water components in a series of (frequently pressurized) vessels. Gas is first separated from liquid components in one vessel, while said liquid components (liquid hydrocarbons and formation water) flow to another vessel and are separated from each other. Separated liquid hydrocarbons are sent to yet another vessel or isolated tank, while the separated formation water is stored for subsequent disposal or injection.

Accurate measurement of liquid hydrocarbons and formation water components is frequently difficult and unreliable using conventional means. Typically, flow meters (turbine meters or other type meters) are used to measure each distinct fluid stream—that is, a separate meter is required to measure liquid hydrocarbons formation water. However, such fluid flow meters can be expensive and are frequently inaccurate. Further, such conventional meters are generally labor intensive and costly because they require frequent calibration, and do not provide any alarm or warning if/when said meters are out of calibration (leaving possible unknown error between calibration events, which can be 3 to 6 months apart or more).

Conventional separator devices simply fill up with production liquids (oil and water) and then dump through a turbine meter periodically which results in a series of slug volumes measured by said turbine meter. As noted above, said meters can be notoriously inaccurate and difficult to keep calibrated. Moreover, for a relatively low rate well, a vessel may not fill up with enough liquid to trigger a dump; as a result, nothing would go through the meter and the daily production rate could be erroneously assumed to be zero, even though said well may have actually produced some liquids into the vessel (but just not enough to trigger a dump).

Thus, there is a need for a cost-effective means for efficiently separating multiphase immiscible fluid mixtures (such as, for example, bulk fluids produced from an oil well) into liquid hydrocarbons, gaseous components and formation water, while simultaneously providing for accurate measurement of said fluids, all without the use of conventional flow meters and multiple vessels. Such measurement should provide for continuous measurement calibration or independent confirmation, as well as an alarm or warning if calibration variance exceeds a predetermined amount, all with no downtime or interruption of operations to perform such calibration/confirmation. Further, such measurement should continuously account for every molecule of oil and water even if it does not dump any liquids during a designated production period.

SUMMARY OF THE INVENTION

The present invention generally comprises an automated process and accompanying apparatus for simultaneously separating and measuring any mixture of immiscible fluids including, without limitation, multiphase fluid mixtures. The method and apparatus of the preferred embodiment provides for continuous separation and measurement of such fluids in at least one vessel, with no downtime (i.e., cessation of such separation and/or measurement operations) required for dumping or evacuation of fluids from said at least one vessel.

In a preferred embodiment, the present invention beneficially comprises a single vessel having a predetermined geometry and dimensions, and defining an internal chamber. Said internal chamber is divided into a plurality of separate compartments. Each compartment is equipped with at least one liquid level sensor and at least one flow conduit in fluid communication with said compartment. Automated valves, in operational engagement with said level sensors, permit selective fluid equalization between certain compartments via said conduits, as well as selective dumping or evacuation of fluids from certain compartments.

A multiphase mixture of immiscible fluids is introduced into a first compartment of said vessel. Gas and liquid phases of said mixture are separated from each other, while immiscible liquids are further separated into different compartments. Liquid levels within each separate compartment are continuously measured using said liquid level sensors; said liquid level sensors may be direct and/or indirect sensors, and may be mounted internally or externally relative to said vessel. Such liquid level measurements (determined by said liquid level sensors), together with material balance analysis, are utilized to determine liquid volumes within each compartment at any given time. Automated valves, operationally engaged with said liquid level sensors, permit fluids within each compartment to be separately evacuated when desired.

The method and apparatus of the present invention can generally repeatedly progress through multiple "phases" to facilitate continuous operation. In a preferred embodiment, said phases comprise: fill-up, pre-dump stabilization, dumping, post dump stabilization, and equalization phases; however, it is to be understood that the aforementioned phases can be altered or modified in some respects without departing from the scope of the present invention. Notwithstanding the foregoing, fluid volumes can be measured continuously and are not dependent upon or a function of completion of any particular phase.

The vessel of the present invention can operate at a wide variety of temperatures and pressures, both naturally and/or artificially induced; when desired, operating temperature and/or pressure can be beneficially adjusted to facilitate the separation of the total fluid system into different phases and components, as well as evacuation of fluid components from said vessel following a rate measurement cycle or other desired interval.

Machine vision, utilizing camera(s) and associated processor(s), can also be used for primary liquid level measurement, secondary or backup liquid level measurement, and/or calibration or confirmation of a primary liquid level measurement system, as more fully described herein. By way of illustration, but not limitation, external sight-glasses can be provided for each compartment (typically with a visible scale or other distance marker), thereby allowing visual identification and determination of each fluid or fluid interface level for each compartment. Such fluid level information obtained using such sight-glasses or other level measuring device(s) can then be used for primary fluid volume measurement, or as a secondary fluid level sensor for back up measurement purposes.

When used as a secondary fluid level system, such sight-glass levels can be used for periodic manual calibration or confirmation, or continuous automated calibration or confirmation, of primary level sensors. Such continuous or automated calibration or confirmation can be performed by continuously monitoring and/or sensing sight-glass levels using any means capable of distinguishing such liquid level(s) and providing a digital signal of such level(s) such as, for example, machine vision camera systems, guided wave radar and/or bar code reading devices. Manual calibration and/or measurement confirmation can be performed periodically (for example, daily) by existing operations or field personnel without specialized training; volumes can be quickly and easily calculated using sight glasses and scales/rulers, and such volumes can be compared to volumes measured using a primary fluid level system.

Additionally, an alarm system can provide audible or visual signals, and/or send digital transmissions or SMS text alerts, in the event that such secondary readings are outside of a predetermined variance compared to levels measured and/or volumes calculated using a primary fluid level sensor system.

The apparatus of the present invention can be remotely operated and monitored in real time, while also allowing for automated or manual calibration. Sensors to measure temperature, pressure and gas chromatograph analysis, oil gravity, and/or oil basic sediment and water can also be added to provide further detail to results.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

The present invention comprises an automated process and accompanying apparatus for simultaneously separating immiscible fluids including, without limitation, multiphase fluid mixtures, and measuring components thereof. The present invention is discussed herein primarily in the context of oil and gas operations, and the separation of multiphase fluid mixtures produced from subterranean oil and/or gas wells. However, it is to be observed that the method and apparatus of the present invention can be beneficially utilized in connection with other applications requiring the efficient and effective continuous separation and measurement of multiphase immiscible fluid mixtures.

In a preferred embodiment, the present invention comprises a single vessel which can be used to separate a bulk mixture of oil, gas and water (including emulsions) into its individual components, and to measure the respective volume of each such separated component. Further, the method and apparatus of the present invention provides for continuous separation and measurement of such fluid production, with little or no downtime (i.e., cessation of such separation and/or measurement operations) required for dumping or evacuation of fluids from said vessel. As used herein, the term "oil" shall be understood to mean any liquid hydrocarbon including, without limitation, crude oil, condensate, natural gas liquids, other hydrocarbon compound or combinations thereof.

Figure 1:
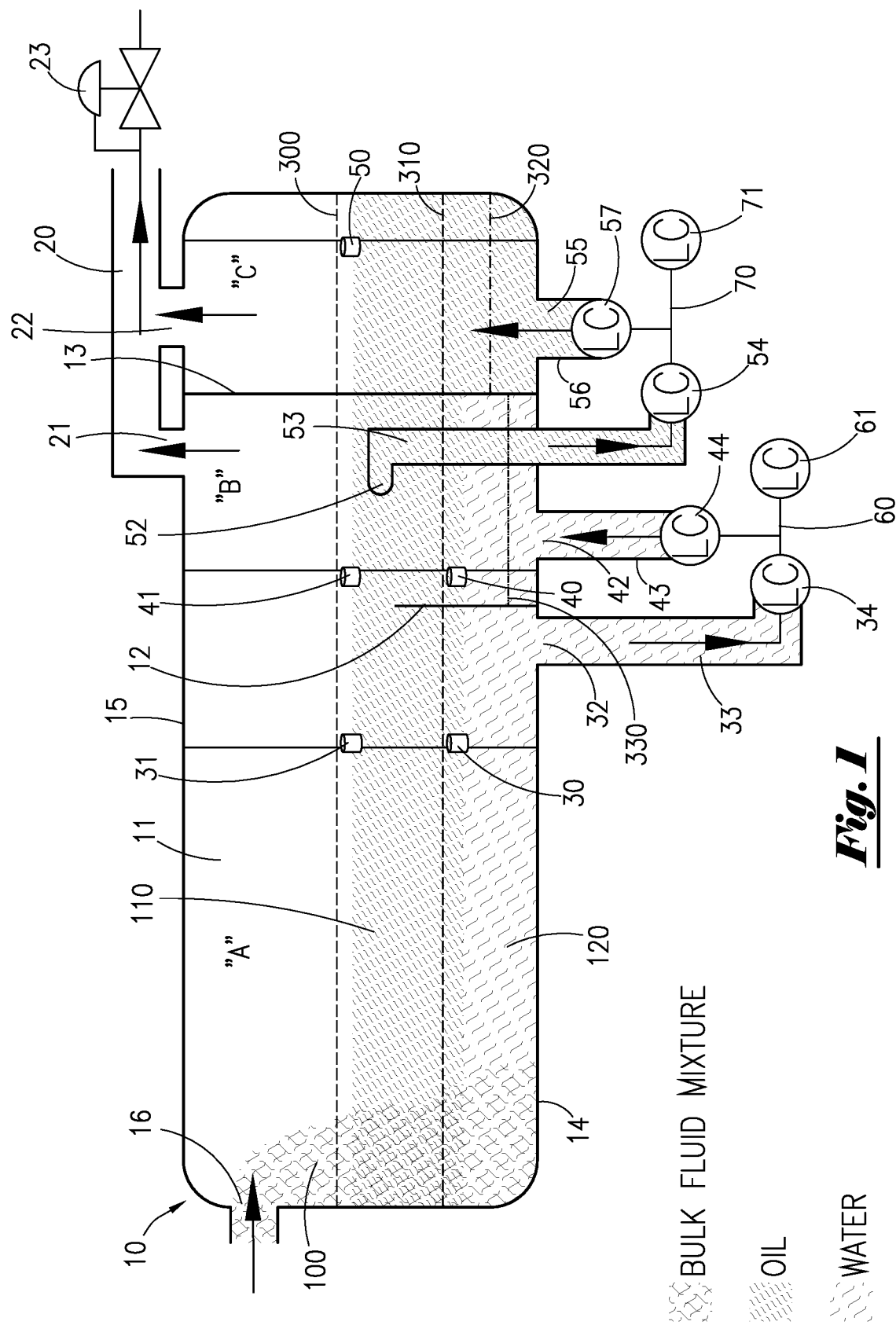
FIG. 1 depicts a side schematic view of a fill-up phase or stage of the present invention.

Referring to the drawings, FIG. 1 depicts a side schematic view of vessel 10 (depicted during a fill-up phase or stage, discussed in detail below). In a preferred embodiment depicted in FIG. 1, vessel 10 comprises a container defining an internal chamber 11. Internal baffle 12 and divider 13 partition said inner chamber 11 into a plurality of discrete compartments. Although other configurations can be envisioned without departing from the scope of the present invention, internal baffle 12 and divider 13 cooperate to divide internal chamber 11 into three separate compartments: bulk separation compartment (denoted "A" on FIG. 1), water isolation compartment (denoted "B" on FIG. 1) and oil isolation compartment (denoted "C" on FIG. 1).

In a preferred embodiment, baffle 12 does not extend the entire distance between lower wall or bottom 14 and upper wall or top 15, of vessel 10; however, it is to be observed that said baffle 12 could extend from bottom 14 to top 15 of vessel 10, so long as appropriate equilibrium piping or conduit allowed for oil flow between bulk separation compartment A and water isolation compartment B. By contrast, in the embodiment depicted in FIG. 1, divider 13 does extend the entire distance between said bottom 14 and top 15. As such, oil isolation compartment C is completely isolated from bulk separation compartment A and water isolation compartment B within internal chamber 11 of vessel 10. It should also be observed that bulk separation compartment A, water isolation compartment B and oil isolation compartment C, or combinations thereof, could alternatively comprise separate vessels without departing from the scope of the present invention, provided that said compartments are all maintained in volumetric equilibrium using any necessary piping/conduits.

Gas outlet port 21 in water isolation compartment B and gas outlet port 22 in oil isolation compartment C extend through upper wall or top 15 of vessel 10 and lead to gas conduit or flow line 20 equipped with pressure relief valve 23. Said gas flow line 20 can extend to a gas pipeline, sales meter, flare assembly or venting assembly (not shown in FIG. 1), all well known to those having skill in the art, for ultimate disposition of natural gas. Further, an orifice meter or other measuring device can be provided on said flow line 20 in order to measure gas volumes passing out of vessel 10 through said gas flow line 20.

Vessel 10 of the present invention can operate at a wide variety of temperatures and pressures, both naturally and/or artificially induced. When desired, operating temperature and/or fluid pressure within internal chamber 11 can be beneficially adjusted to facilitate the separation of the total fluid system into different phases and components, as well as evacuation of fluid components from said separate compartments. Although not depicted in FIG. 1, adjustable heating elements can be utilized to adjust the operating temperature of vessel 10 and any fluids contained within internal chamber 11, while a gas compressor can be utilized to increase fluid pressure within said internal chamber 11.

At least one liquid level sensor is provided within each discrete chamber in vessel 10. In the embodiment depicted in FIG. 1, liquid level sensors 30 and 31 are provided in bulk separation compartment A, liquid level sensors 40 and 41 are provided in water isolation compartment B, and oil liquid level sensor 50 is provided in oil isolation compartment C. In a preferred embodiment, said liquid level sensors each measure the upper level of liquids contained within their respective compartments relative to bottom wall or base 14 of vessel 10, as more fully set forth herein. For example, as depicted in FIG. 1, liquid level sensor 30 measures the upper level of water and the oil/water interface, while liquid level sensor 31 measures the upper level of oil and the oil/gas interface, in bulk separation compartment A. Similarly, liquid level sensor 40 measures the upper level of water and the oil/water interface, while liquid level sensor 41 measures the upper level of oil and the oil/gas interface, in water isolation compartment B. Oil liquid level sensor 50 measures the upper level of oil and the oil/gas interface in oil isolation compartment C.

First water outlet port 32 extends through bottom wall or base 14 of vessel 10 within bulk separation compartment A and connects to first water conduit or flow line 33 having automated liquid control valve 34. Second water port 42 extends through bottom wall or base 14 of vessel 10 within water isolation compartment B and connects to second water conduit or flow line 43 having automated liquid control valve 44. Said first water flow line 33 and second water flow line 43 are in fluid communication with water evacuation flow line 60 which is equipped with automated liquid control valve 61. Evacuation flow line 60 can extend to a water storage tank, pipeline or disposal/injection well (not depicted in FIG. 1), all well known to those having skill in the art, for ultimate disposition of said produced water.

First oil conduit or flow line 53, having upper inlet port 52 and automated liquid control valve 54, extends through bottom wall or base 14 of vessel 10 within water isolation compartment B; said oil conduit 53 could also be mounted externally without departing from the scope of the present invention. Oil outlet port 55 extends through bottom wall or base 14 of vessel 10 within oil isolation compartment C and connects to second oil conduit or flow line 56 having automated liquid control valve 57. Said first oil flow line 53 and second oil flow line 56 are in fluid communication with oil evacuation flow line 70 which is equipped with automated liquid control valve 71. Oil evacuation flow line 70 can extend to an oil storage tank, pipeline or lease automated custody transfer "(LACT)" meter (not depicted in FIG. 1), all well known to those having skill in the art, for ultimate disposition and/or sale of said produced oil.

As noted above, liquid levels within each separate compartment A, B and C are continuously measured using direct and/or indirect liquid level sensors; said liquid level sensors may be mounted internally or externally relative to vessel 10. As depicted in FIG. 1, liquid level sensors 30, 31, 40, 41 and 50 each comprise buoyant floating elements that float on the upper surface of particular liquids, monitor the relative positions of said floating elements within chamber 11, and signal such information to a remote location (such as a computer processor). By way of illustration, but not limitation, said liquid level sensors 30, 31, 40, 41 and/or 50 can comprise "Model 1000S" digital tank gauge devices marketed by Advanced Telemetrics, Inc., or other liquid level sensors having similar characteristics and functionality.

Such liquid level measurements (determined by said liquid level sensors), together with material balance analysis, are utilized to determine liquid volumes within each compartment at any given point in time. Further, such liquid level sensors are operationally engaged with automated liquid control valves as more fully set forth herein; said liquid level sensor readings can be converted into digital data which can be used, together with at least one computer processor, to control automated control valves, such as valves 34, 44, 61, 54, 57 and/or 71.

The volume of a particular liquid in a particular compartment can be volumetrically calculated using the respective liquid's level in said compartment (measured by an applicable sensor), multiplied by a volume constant; the volume constant for each compartment is a function of that compartment's dimensions and can be calculated using formulas applicable to the compartment's (and vessel's) geometry. Generally, material balance is achieved by temporarily isolating water isolation compartment B and oil isolation compartment C from bulk separation compartment A when dumping is triggered for liquid(s) in either compartment B and/or C as more fully described herein.

The present invention permits measurement of liquid "stock" volumes within internal chamber 11 of vessel 10 at any desired point in time. For example, an oil "stock" volume comprises a sum of the oil volumes in compartment A, compartment B and compartment C at any desired point in time. The oil volume in compartment A can be volumetrically determined knowing the dimensions of compartment A, as well as the height of the oil column in compartment A as measured by the relative positions of liquid level sensors 30 and 31. The oil volume in compartment B can be volumetrically determined knowing the dimensions of compartment B, as well as the height of the oil column in compartment B as measured by the relative positions of liquid level sensors 40 and 41. The oil volume in compartment C can be volumetrically determined knowing the dimensions of compartment C, as well as the height of the oil column in compartment C as measured by the liquid level sensors 50.

A water "stock volume" comprises a sum of the water volumes in compartment A and compartment B (because there is no water in compartment C, no volume from compartment C is included) at any desired point in time. The water volume in compartment A can be volumetrically determined knowing the dimensions of compartment A, as well as the height of the water column in compartment A as measured by liquid level sensor 30. The water volume in compartment B can be volumetrically determined knowing the dimensions of compartment B, as well as the height of the water column in compartment B as measured by liquid level sensors 40.

In a preferred embodiment, during a preselected production period, the method and apparatus of the present invention will typically progress through multiple "phases", all of which together comprise a single cycle which can be continuously repeated; said phases generally comprise: fill-up, pre-dump stabilization, dumping, post dump stabilization, and equalization phases. However, it is to be understood that the aforementioned phases can be altered or modified in some respects without departing from the scope of the present invention. Production volumes can be measured continuously and are not dependent upon or a function of completion of any particular phase or cycle. As a result, production flow rates for oil (and water, if desired) can be determined over any desired or predetermined time interval.

Referring to the drawings, FIG. 1 depicts a side schematic view of vessel 10 depicted during a fill-up phase or stage. In a preferred embodiment, a multiphase mixture of immiscible fluids 100 is introduced into said vessel via fluid inlet 16. By way of illustration, but not limitation, said fluid mixture 100 can comprise a bulk production stream produced from a subterranean oil well generally comprising oil, formation water and natural gas in various proportions (including, without limitation, emulsions). Although said production stream can be piped into vessel 10 from the outlet of another vessel or storage tank, it is to be observed that said production stream can be piped directly from the outlet flow line of a subterranean well into vessel 10.

Multiphase immiscible fluid mixture 100 enters internal chamber 11 of vessel 10 via inlet port 16 and is received within bulk separation compartment A within internal chamber 11 of said vessel 10. Gas and liquid phases of said mixture are initially separated from one another. Such separated gas rises within internal chamber 11, and eventually exits vessel 10 via gas outlet port 21 and gas flow line 20. Separated liquid components of said fluid mixture 100 (oil and water, including emulsions) remain within bulk separation compartment A. Said liquid components contained within said bulk separation compartment A will further gravity separate, with (heavier) water component 120 settling on the bottom of said bulk separation compartment A and (lighter) oil component 110 floating on said water component 120.

As multiphase immiscible fluid mixture 100 continues to enter internal chamber 11 of vessel 10 via inlet port 16, the overall liquid volume in bulk separation compartment A increases, causing the total liquid level in said compartment A to rise. Eventually, liquid in compartment A rises to a level higher than divider baffle 12, causing a portion of said liquid from compartment A to spill or flow over the upper surface of divider baffle 12 into water isolation compartment B. In a preferred embodiment, the upper surface of baffle 12 is positioned, and compartment A is sized for fluid retention purposes, so that only oil (and very little, if any, water) passes over said baffle 12 into compartment B.

In the configuration depicted in FIG. 1, liquid level sensors 31, 41 and 50 sense that the upper level of liquids in each of said compartments has not risen to the level of predetermined oil dump level 300. As such, said liquid level sensors 31, 41 and 50 send signals to liquid control valves 54 and 57 to remain open, and to liquid control valve 71 to remain closed. Similarly, liquid level sensors 30 and 40 sense that the upper level of water in each of compartments A and B has not risen to the level of predetermined water dump level 310. As such, said liquid level sensors 30 and 40 send signals to liquid control valves 34 and 44 to remain open, and to liquid control valve 61 to remain closed.

In this configuration, water from the bottom of water compartment A flows out of first water outlet port 32, through first water conduit 33, automated liquid control valve 34, second liquid control valve 44, second water conduit 43, second water port 42; in this manner, water levels in bulk separation compartment A and water isolation compartment B are permitted to equalize. Similarly, a portion of the liquid in water isolation compartment B flows into upper inlet port 52 of first oil conduit 53; because of the location of said inlet port 52 near the upper extent of the liquid level in said water isolation compartment B, said liquid entering said inlet port 52 is all (or substantially all) oil with very little, if any, water component. Such oil passes through first oil conduit 53 and first liquid control oil valve 54, past second liquid control valve 57, through second oil conduit 56 and into oil isolation compartment C in this manner, oil levels in water isolation compartment B and oil isolation compartment C is permitted to equalize.

Because such liquid that passes over divider baffle 12 has been (at least partially) separated while retained within bulk separation compartment A, which is sized for ideal retention time and oil/water separation, and because said liquid generally flows from the uppermost portion of said liquid contained within compartment A, such liquid passing into water isolation compartment B over divider baffle 12 will typically contain all or substantially all oil by volume compared to immiscible fluid mixture 100. Conversely, liquid from the bottom of water compartment A transferring into water isolation compartment B via fluid equalization conduits 33 and 43 will typically contain all or substantially all water by volume compared to immiscible fluid mixture 100. Such liquid contained within water isolation compartment B will further gravity separate, with water component 120 settling on the bottom of said water isolation compartment B and oil component 110 floating on said water component 120.

Figure 2:
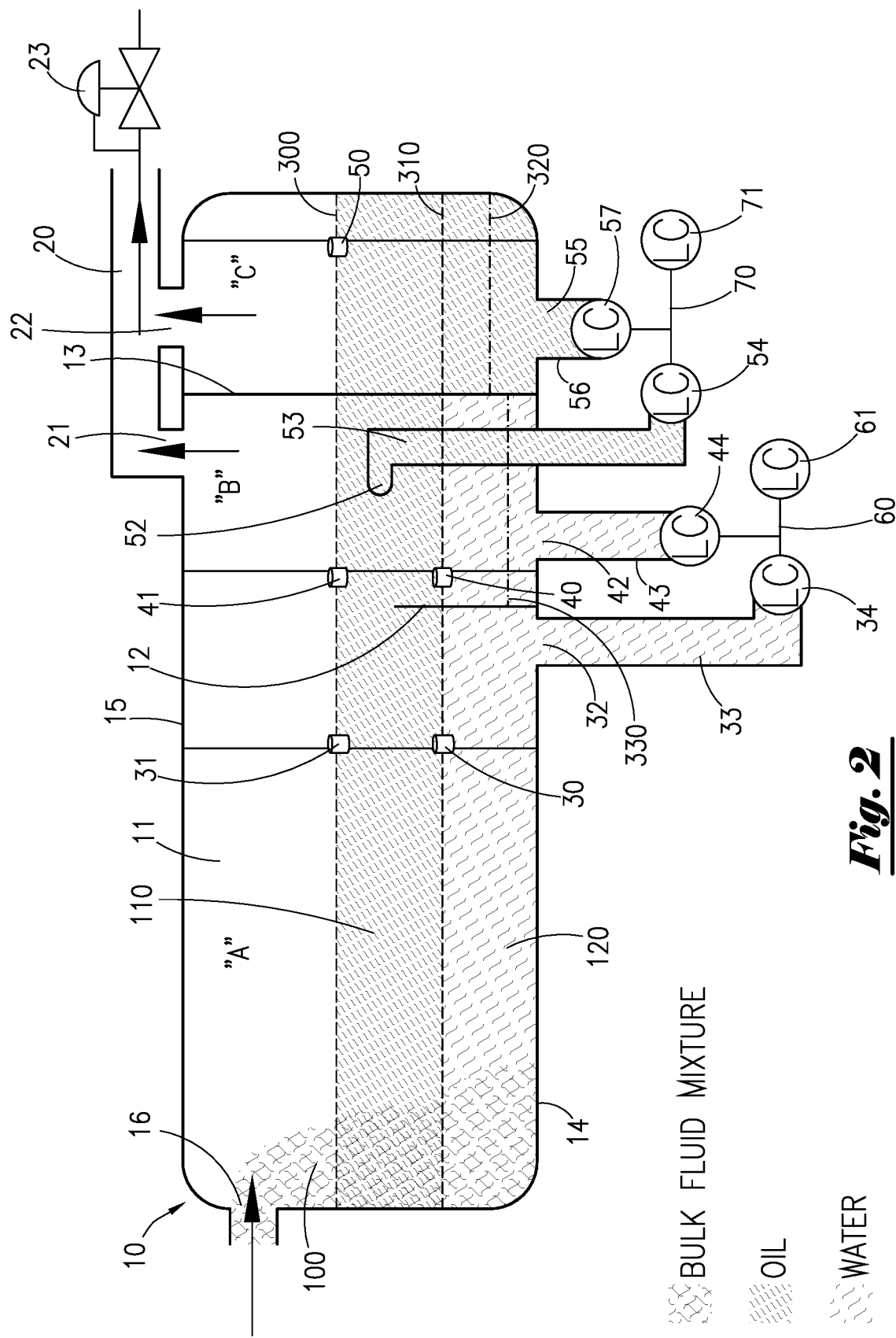
FIG. 2 depicts a side schematic view of a pre-dump stabilization phase or stage of the present invention.

FIG. 2 depicts a side schematic view of a pre-dump stabilization phase or stage of the present invention. As depicted in FIG. 2, liquid level sensors 31, 41 and 50 sense that the upper level of liquids in said compartments has risen to the level of predetermined oil dump level 300. As such, said liquid level sensors 31, 41 and 50 send signals to liquid control valves 54 and 57 to close (and to liquid control valve 71 to remain closed). Similarly, liquid level sensors 30 and 40 sense that the upper level of water in compartments A and B has also risen to the level of predetermined water dump level 310. As such, said liquid level sensors 30 and 40 send signals to liquid control valves 34 and 44 to close (and to liquid control valve 61 to remain closed). Thus, all oil and water automated flow control valves are closed isolating them from compartment (A) to stabilize their levels and record their respective volumes. This stabilization period can be set to virtually any acceptable time interval by a user, but is generally accomplished within 1 to 3 seconds.

Figure 3:
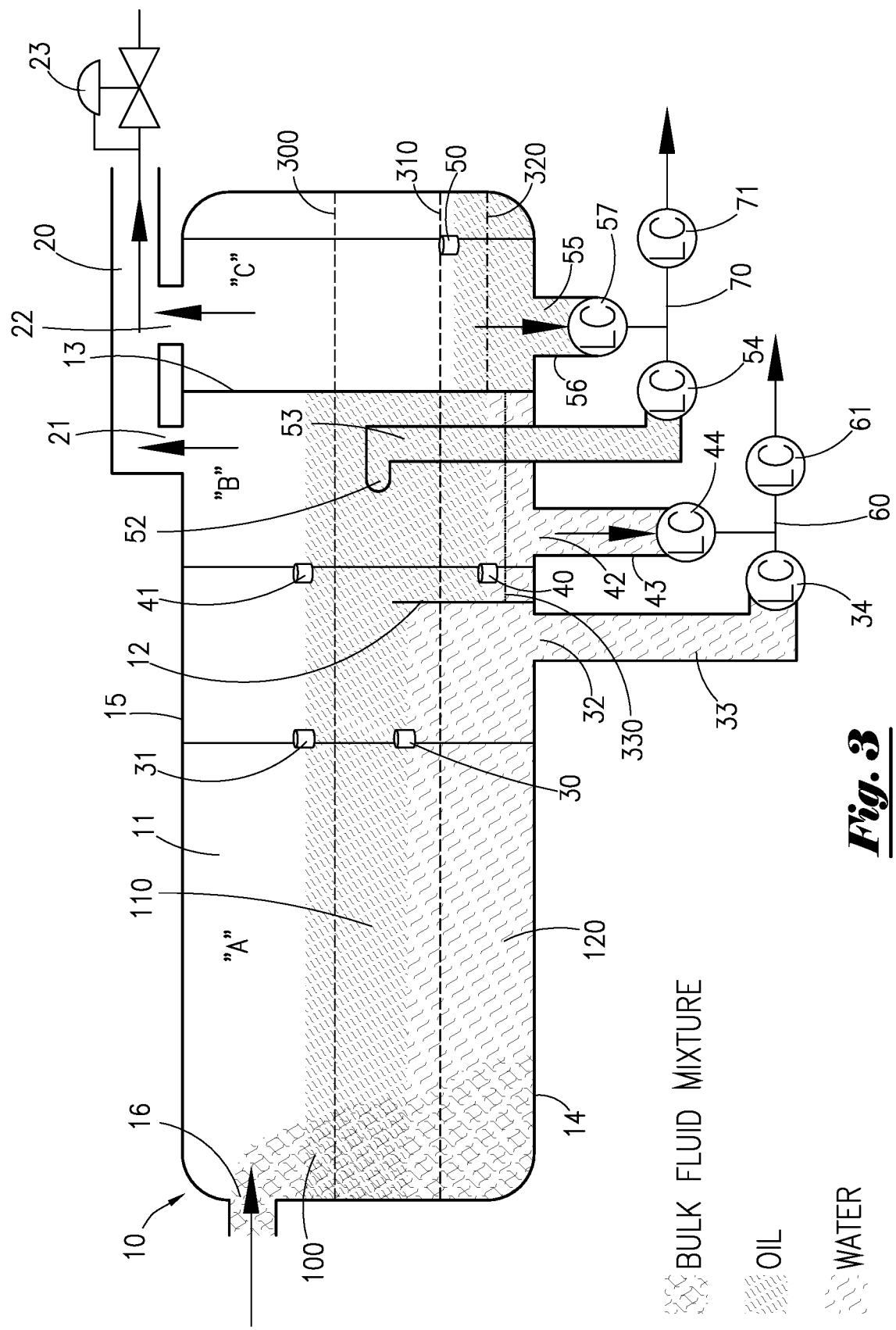
FIG. 3 depicts a side schematic view of a dumping phase or stage of the present invention.

FIG. 3 depicts a side schematic view of a dumping phase or stage of the present invention. During said dumping phase, when water is being dumped, flow control valve 34 is closed, while flow control valves 44 and 61 are open, thereby permitting water to evacuate compartment B via flow lines 43 and 60. The volume of water dumped from compartment B during said water dumping phase equals the difference in water stock levels immediately before and after said water dumping phase.

Similarly, when oil is being dumped (as depicted in FIG. 3), flow control valve 54 is closed, while flow control valves 57 and 71 are open, thereby permitting oil to evacuate compartment C via flow lines 56 and 70. The volume of oil dumped from compartment C during said oil dumping phase equals the difference in oil stock levels immediately before, and immediately after, said water dumping phase. During a dumping phase, the stock volumes of the respective fluids being dumped from compartments B or C are held constant at the volumes measured during the pre-dump stabilization phase while such fluids are being evacuated from the vessel for calculation purposes.

Figure 4:
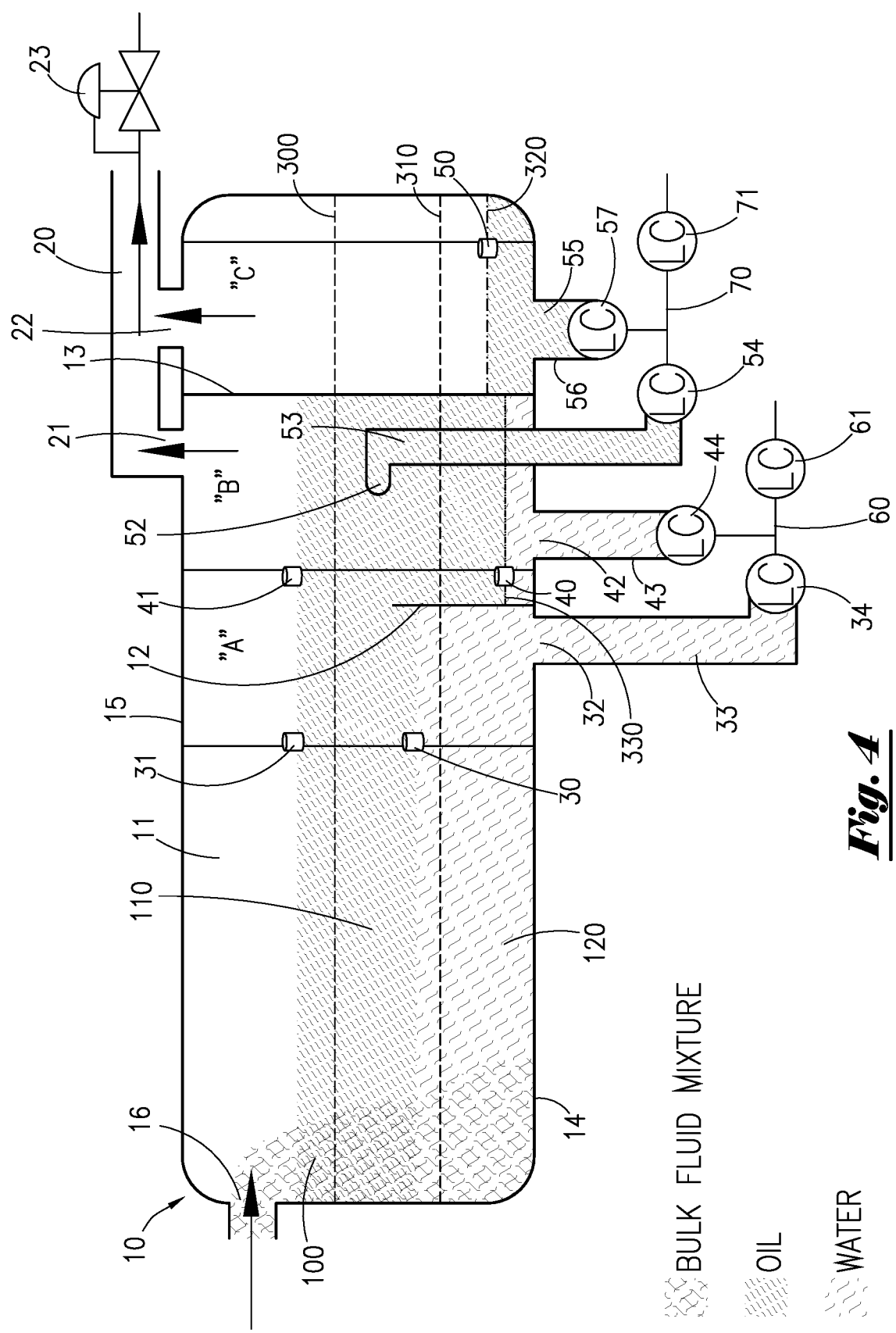
FIG. 4 depicts a side schematic view of a post-dump stabilization phase or stage of the present invention.

FIG. 4 depicts a side schematic view of a post-dump stabilization phase or stage of the present invention, which begins when dumping oil and water levels reach their dump close levels 320 and 330, respectively. For water, (as depicted in FIG. 4), liquid level sensor 40 senses that the upper level of water in water isolation compartment B has reached its predetermined water dump close level 330. As such, said liquid level sensor 40 sends a signal to liquid control valves 44 and 61 to close (and to liquid control valve 34 to remain closed).

A similar process occurs during a post-dump stabilization phase for oil. In such instance, as oil level in compartment C falls, liquid level sensor 50 eventually senses that the upper level of oil in oil isolation compartment C has reached its predetermined oil dump close level 320. As such, said liquid level sensor 50 sends a signal to liquid control valves 57 and 71 to close (and to liquid control valve 54 to remain closed).

With all valves closed on the compartments B and C, a stabilization period occurs; the length of this stabilization period can be set to a predetermined interval by a user but is generally accomplished within 1 to 3 seconds. During this period, the post dump water and oil stock volumes and are measured and recorded and utilized to calculate the dumped volumes for the stage.

Figure 5:
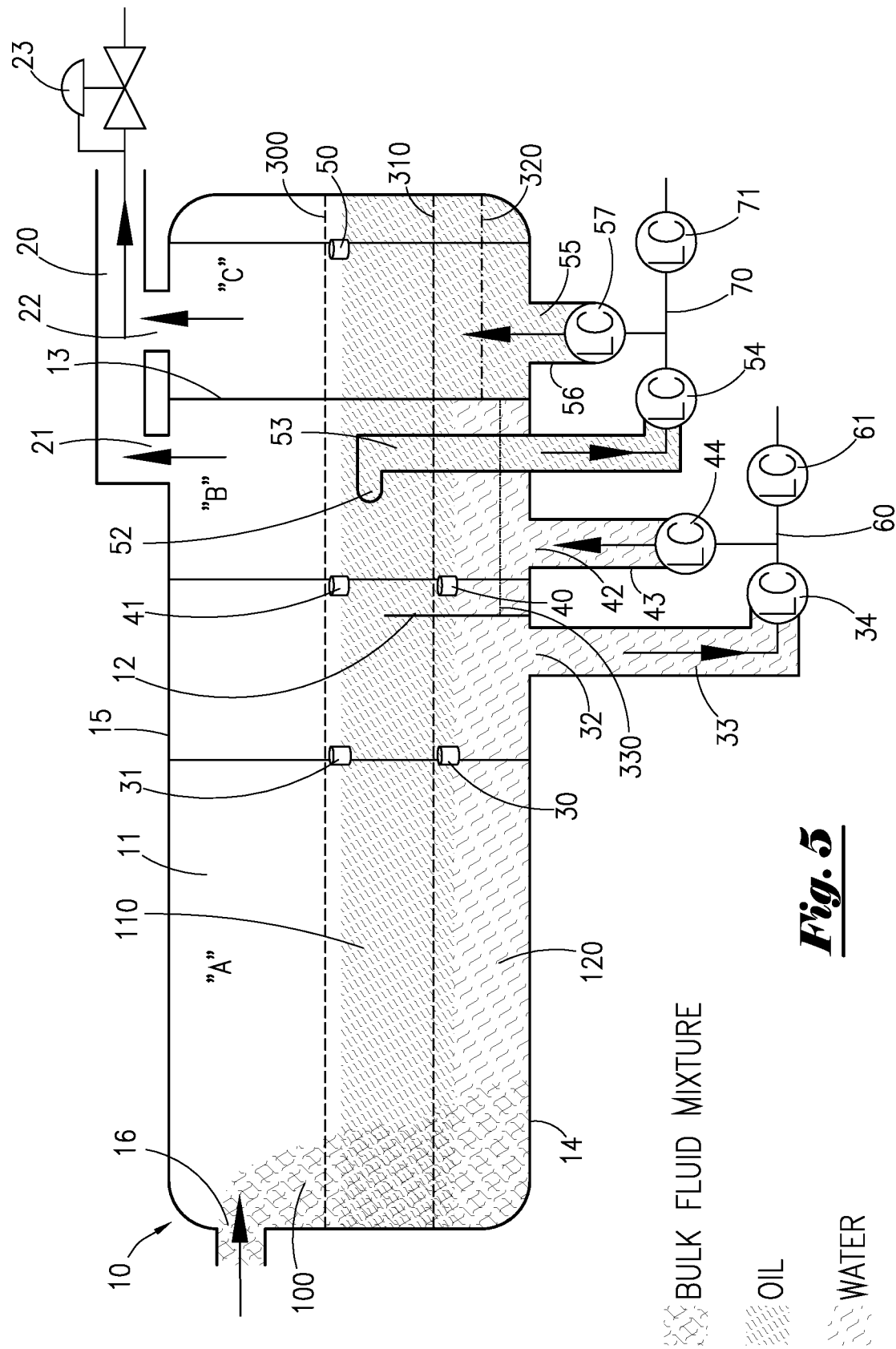
FIG. 5 depicts a side schematic view of an equalization phase or stage of the present invention.

FIG. 5 depicts a side schematic view of an equalization phase or stage of the present invention following such post-dump stabilization period. In this phase, the apparatus of the present invention is essentially in the same basic configuration as depicted in FIG. 1. Namely, liquid control valves 54 and 57 are open, while liquid control valve 71 is closed. Liquid control valves 34 and 44 are also open, while liquid control valve 61 is closed. In this configuration, water levels in bulk separation compartment A and water isolation compartment B are permitted to equalize. Similarly, oil levels in water isolation compartment B and oil isolation compartment C is permitted to equalize. The apparatus of the present invention remains in this configuration until a pre-dump stabilization phase (such as depicted in FIG. 2) has been reached as sensed by liquid level sensors, at which point the cycle or process repeats. At all times during the process, bulk fluids can be permitted to flow into internal chamber 11 of vessel 10 via fluid inlet 16; in this manner, all fluids flowing into vessel 10 are accounted for at all times, resulting in material balance.

In operation, the present invention permits measurement of liquid "stock" volumes within internal chamber 11 of vessel 10 at any desired time; measurement of said volumes at multiple desired points in time permits determination of production rate(s) over a desired time interval. In this manner, the gross production flow rate for each liquid component is equivalent to the change in stock volume for such liquid, plus the cumulative dumped volumes for said liquid, during a given change in time or desired time interval. Although liquid level sensors 30, 31, 40, 41 and 50 are depicted as buoyant float sensors, other liquid level sensors or measurement means can be used in addition to, or in place of, said float sensors. By way of illustration, but not limitation, external sight-glasses can be provided on vessel 10 for each compartment A, B, and C (typically with a visible scale or other distance marker), thereby allowing visual identification and determination of each fluid or fluid interface level for each such compartment. Such sight-glass fluid and/or fluid interface levels can be continuously monitored and/or sensed using any means capable of distinguishing such fluid level(s) and providing a digital signal of such level(s) such as, for example, machine vision camera systems, guided wave radar and/or bar code reading devices, all of which can be operationally engaged with automated liquid control valves described herein. When a back-up or secondary fluid level sensing and volume measurement system is provided for calibration or confirmation of a primary fluid level sensing and volume measurement system, an alarm system can provide audible and/or visual signals, and/or send digital transmissions or SMS text alerts, in the event that such secondary readings are outside of a predetermined variance compared to levels measured and/or volumes calculated using said primary system.

Importantly, unlike conventional methods of separation and measurement, the method and apparatus of the present invention does not require downtime or delay during vessel dumping or for fluid volume measurement calibration.

Devices to measure temperature, pressure, oil gravity, oil basic sediment and water ("BS&W") content and gas chromatograph analysis can be added to provide further detail to volume measurements. Control automation capabilities are also available based on user defined parameters. The present invention can be remotely operated and monitored in real time, while also allowing for automated or manual calibration.

The present invention uses pumps, gas compressors, externally supplied gas, gravity flow or combinations thereof. Machine vision, using camera(s) and associated processor(s) can be used as part of the present invention for primary liquid level measurement, backup liquid level measurement and/or calibration of the primary liquid level measurement system as more fully described herein.

Further, the present invention can be used to separate and measure fluid volumes produced from multiple wells, such as at a multi-well commingling facility. In conventional commingling facilities, multiple wells typically flow into a central storage tank or other vessel; commingled production from such central storage facility is collected and measured prior to sale. The total sales volume is then allocated back to individual wells/leases based on metered volumes (typically using dedicated separator units equipped with meters) or periodic well tests (typically using at least one shared "test separator"). However, both allocation methods are inherently inaccurate and can result in production being erroneously over or under allocated to certain wells/leases.

By contrast, the method and apparatus of the present invention can be used to accurately measure actual production volumes produced from each well. With the present invention, each well/lease (or other desired allocation grouping) can be equipped with the apparatus of the present invention. Because all production liquids are accounted for, the sum of measured volumes from such multiple vessels will be equivalent to actual stock tank volumes of all commingled production volumes in a sales tank. Further, such measured volumes can easily be converted to actual oil sales volumes in accordance with standard purchaser requirements using oil gravity, temperature and pressure data, all of which can be measured in the vessel of the present invention.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method for separating and measuring volume of an immiscible well production fluid mixture including oil and water comprising:
   a) continuously introducing said immiscible well production fluid mixture into a separation and measurement assembly comprising a vessel having an internal chamber, wherein said internal chamber further comprises a plurality of compartments having predetermined dimensions;
   b) separating gaseous components from liquid components of said immiscible well production fluid mixture in said internal chamber of said separation and measurement assembly;
   c) measuring upper and lower levels of oil in each of said compartments at a first time;
   d) measuring upper and lower levels of water in each of said compartments at said first time;
   e) volumetrically calculating volumes of oil in each of said compartments using said measured oil levels and said predetermined dimensions of said compartments at said first time; and
   f) summing said calculated volumes of oil from each of said compartments.

2. The method of claim 1, further comprising:
   a) volumetrically calculating volumes of water in each of said compartments using said measured water levels and said predetermined dimensions of said compartments at said first time; and
   b) summing the calculated volumes of water from each of said compartments.

3. The method of claim 1, wherein said separation and measurement assembly further comprises:
   a) at least one oil level sensor in each of said compartments, wherein said at least one oil level sensor is configured to continuously measure said upper level of oil in a compartment; and
   b) at least one water level sensor in each of said compartments, wherein said at least one water level sensor is configured to continuously measure said upper level of water in a compartment.

4. The method of claim 3, wherein each of said oil level sensors comprises a buoyant float assembly, machine vision assembly or combinations thereof.

5. The method of claim 3, wherein each of said water level sensors comprises a buoyant float assembly, machine vision assembly or combinations thereof.

6. The method of claim 1, wherein said vessel further comprises at least one sight glass disposed on said vessel for each of said compartments.

7. The method of claim 6, wherein said upper and lower levels of oil and water are measured using said sight glass.

8. A method for separating and measuring flow rate of an immiscible well production fluid mixture including oil and water over a predetermined time period comprising:
   a) continuously introducing said immiscible well production fluid mixture into a separation and measurement assembly comprising a vessel having an internal chamber, wherein said internal chamber further comprises a plurality of compartments having predetermined dimensions;
   b) separating gaseous components from liquid components of said immiscible well production fluids mixture in said internal chamber of said separation and measurement assembly;
   c) determining a volume of oil in each of said compartments at a first time at the start of said predetermined time period, comprising:

(i) measuring upper and lower levels of oil in each of said compartments at said first time;
(ii) volumetrically calculating volumes of oil in each of said compartments using said measured oil levels and said predetermined dimensions of said compartments at said first time;
(iii) summing said calculated volumes of oil from each of said compartments at said first time;
d) determining volumes of oil in each of said compartments at a second time at the end of said predetermined time period, comprising:
(i) measuring upper and lower levels of oil in each of said compartments at said second time;
(ii) volumetrically calculating volumes of oil in each of said compartments using said measured oil levels and said predetermined dimensions of said compartments at said second time;
(iii) summing said calculated volumes of oil from each of said compartments at said second time;
e) deducting said sum of calculated oil volumes at said second time from said sum of calculated oil volumes at said first time to calculate a volume of oil produced during said predetermined time period; and
f) dividing said volume of oil produced during said predetermined time period by the duration of said predetermined time period.

9. The method of claim 8, further comprising:
a) determining volumes of water in each of said compartments at said first time, comprising:
(i) measuring upper and lower levels of water in each of said compartments at a first time;
(ii) volumetrically calculating volumes of water in each of said compartments using said measured water levels and said predetermined dimensions of said compartments at said first time;
(iii) summing said calculated volumes of water from each of said compartments at said first time;
b) determining volumes of water in each of said compartments at a second time at the end of said predetermined time period, comprising:
(i) measuring upper and lower levels of water in each of said compartments at said second time;
(ii) volumetrically calculating volumes of water in each of said compartments using said measured water levels and said predetermined dimensions of said compartments at said second time;
(iii) summing said calculated volumes of water from each of said compartments at said second time;
c) deducting said sum of calculated water volumes at said second time from said sum of calculated water volumes at said first time to calculate a volume of water produced during said predetermined time period; and
d) dividing said volume of water produced during said predetermined time period by the duration of said predetermined time period.

10. The method of claim 8, wherein said separation and measurement assembly further comprises at least one oil level sensor in each of said compartments, wherein said at least one oil level sensor is configured to continuously measure said upper level of oil in a compartment.

11. The method of claim 9, wherein said separation and measurement assembly further comprises at least one water level sensor in each of said compartments, wherein said at least one water level sensor is configured to continuously measure said upper level of water in a compartment.

12. The method of claim 10, wherein each of said oil level sensors comprises a buoyant float assembly, machine vision assembly or combinations thereof.

13. The method of claim 11, wherein each of said water level sensors comprises a buoyant float assembly, machine vision assembly or combinations thereof.

14. The method of claim 9, wherein said vessel further comprises at least one sight glass disposed on said vessel for each of said compartments.

15. A method for separating and measuring an immiscible well production fluid mixture including oil and water over a predetermined time period comprising:
a) continuously introducing said immiscible well production fluid mixture into a separation and measurement assembly comprising a vessel having an internal chamber, wherein said internal chamber further comprises a plurality of compartments having predetermined dimensions;
b) separating gaseous components from liquid components of said immiscible well production fluids mixture in said internal chamber of said separation and measurement assembly;
c) determining volumes of oil in each of said compartments at the start of said time period, comprising:
(i) measuring upper and lower levels of oil in each of said compartments at the start of said time period;
(ii) volumetrically calculating volumes of oil in each of said compartments using said measured oil levels and said predetermined dimensions of said compartments at the start of said time period;
(iii) summing said calculated volumes of oil from each of said compartments at the start of said time period;
d) dumping oil from at least one of said compartments;
e) determining volume of oil dumped from said at least one compartment at a second time immediately following said dumping comprising:
i) measuring upper and lower levels of oil in each of said compartments at said second time;
ii) volumetrically calculating volumes of oil in each of said compartments using said measured oil levels and said predetermined dimensions of said compartments at said second time;
iii) summing said calculated volumes of oil from each of said compartments at said second time;
iv) deducting said sum of calculated oil volumes at said second time from said sum of calculated oil volumes at said first time;
f) determining volumes of oil in each of said compartments at the end of said time period, comprising:
(i) measuring upper and lower levels of oil in each of said compartments at the end of said time period;
(ii) volumetrically calculating volumes of oil in each of said compartments using said measured oil levels and said predetermined dimensions of said compartments at the end of said time period;
(iii) summing said calculated volumes of oil from each of said compartments at the end of said time period;
g) calculating the difference between said sum of calculated oil volumes at the end of said time period and said sum of calculated oil volumes at the beginning of said time period, and adding said dumped volume of oil to said difference.

16. The method of claim 15, further comprising:
a) determining volumes of water in each of said compartments at the start of said time period, comprising:
(i) measuring upper and lower levels of water in each of said compartments at the start of said time period;

(ii) volumetrically calculating volumes of water in each of said compartments using said measured water levels and said predetermined dimensions of said compartments at the start of said time period;
(iii) summing said calculated volumes of water from each of said compartments at the start of said time period;

b) dumping water from at least one of said compartments;
c) determining volume of water dumped from said at least one compartment at a second time immediately following said dumping comprising:
(i) measuring upper and lower levels of water in each of said compartments at said second time;
(ii) volumetrically calculating volumes of water in each of said compartments using said measured water levels and said predetermined dimensions of said compartments at said second time;
(iii) summing said calculated volumes of water from each of said compartments at said second time;
(iv) deducting said sum of calculated water volumes at said second time from said sum of calculated water volumes at said first time;
d) determining volumes of water in each of said compartments at the end of said time period, comprising:
(i) measuring upper and lower levels of water in each of said compartments at the end of said time period;
(ii) volumetrically calculating volumes of water in each of said compartments using said measured water levels and said predetermined dimensions of said compartments at the end of said time period;
(iii) summing said calculated volumes of water from each of said compartments at the end of said time period;
e) calculating the difference between said sum of calculated water volumes at the end of said time period and said sum of calculated water volumes at the beginning of said time period, and adding said dumped volume of water to said difference.

17. The method of claim 15, wherein said separation and measurement assembly further comprises at least one oil level sensor in each of said compartments, wherein said at least one oil level sensor is configured to continuously measure said upper level of oil in a compartment.

18. The method of claim 16, wherein said separation and measurement assembly further comprises at least one water level sensor in each of said compartments, wherein said at least one water level sensor is configured to continuously measure said upper level of water in a compartment.

19. The method of claim 17, wherein each of said oil level sensors comprises a buoyant float assembly, machine vision assembly or combinations thereof.

20. The method of claim 18, wherein each of said water level sensors comprises a buoyant float assembly, machine vision assembly or combinations thereof.

* * * * *